US008667181B2

United States Patent
Ando (10) Patent No.: US 8,667,181 B2
(45) Date of Patent: Mar. 4, 2014

(54) COMMUNICATION DEVICE (75) Inventor: Satoko Ando, Chita (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 226 days.

(21) Appl. No.: 13/363,136

(22) Filed: Jan. 31, 2012

(65) Prior Publication Data
US 2012/0254469 A1  Oct. 4, 2012

(30) Foreign Application Priority Data

Mar. 31, 2011  (JP) ................................ 2011-078107

(51) Int. Cl.
G06F 15/16  (2006.01)
(52) U.S. Cl.
USPC ............ 709/248; 709/203; 709/223; 370/352
(58) Field of Classification Search
USPC ......................... 709/203, 223, 248; 370/352
See application file for complete search history.

(56) References Cited

U.S. PATENT DOCUMENTS

| 6,487,609 | B1 |  | 11/2002 | Blackwood et al. |
|---|---|---|---|---|
| 7,724,657 | B2 | * | 5/2010 | Rao et al. ....................... 370/229 |
| 2004/0073946 | A1 | * | 4/2004 | Kobayashi .................... 725/132 |
| 2004/0133668 | A1 | * | 7/2004 | Nicholas, III ................. 709/223 |
| 2005/0094625 | A1 | * | 5/2005 | Bouat ............................ 370/352 |
| 2007/0124440 | A1 |  | 5/2007 | Maki |
| 2009/0103537 | A1 | * | 4/2009 | Takahashi ...................... 370/392 |
| 2009/0141883 | A1 | * | 6/2009 | Bastien .................... 379/213.01 |
| 2009/0164816 | A1 |  | 6/2009 | Yasuda |
| 2010/0274634 | A1 | * | 10/2010 | Ifrah ................................ 705/10 |
| 2011/0078237 | A1 | * | 3/2011 | Nakamura ..................... 709/203 |
| 2012/0243554 | A1 | * | 9/2012 | Sybesma et al. .............. 370/464 |
| 2012/0254469 | A1 | * | 10/2012 | Ando ............................ 709/248 |

FOREIGN PATENT DOCUMENTS

| JP | 2001-154823 A | 6/2001 |
|---|---|---|
| JP | 2007-102630 A | 4/2007 |
| JP | 2009-151537 A | 7/2009 |
| JP | 2010-094925 A | 4/2010 |

* cited by examiner

Primary Examiner — Tesfay Yohannes
(74) Attorney, Agent, or Firm — Baker Botts L.L.P.

(57) ABSTRACT

A communication device may receive a first request packet from a first device and receive a second request packet from a second device. The communication device may send a first response packet to the first device in response to the first request packet and send a second response packet to the second device in response to the second request packet. The communication device may decide a timing for sending the second response packet to the second device. The timing may be decided such that a time period from receiving the second request packet to sending the second response packet in response to the second request packet is longer than a time period from receiving the first request packet to sending the first response packet in response to the first request packet. The communication device may send the second response packet to the second device at the decided timing.

7 Claims, 3 Drawing Sheets

COMMUNICATION DEVICE

CROSS-REFERENCE TO RELATED APPLICATIONS

This application claims priority to Japanese Patent Application No. 2011-078107, filed on Mar. 31, 2011, the contents of which are hereby incorporated by reference into the present application.

TECHNICAL FIELD

The present application discloses a communication device to send a response packet in response to a request packet sent from an external device.

DESCRIPTION OF RELATED ART

An MFP (multi-function peripheral) to be connected with a client computer is known. When an event descriptor string is received from the client computer, the MFP sends a success message or an error message to the client computer in response to the event descriptor string.

SUMMARY

In the above art, e.g., in a situation where the MFP repeatedly receives event descriptor strings from a plurality of client computers, there may be variations in the receiving timings of the event descriptor strings. In this case, the MFP might not be able to execute efficient processes.

In the present specification, an art is taught that, in a situation where request packets from a plurality of devices are received repeatedly, the receiving timings of the request packets of the plurality of devices may be brought closer together.

An art disclosed in the present application is a communication device to be respectively connected with a first device and a second device. The first device may be configured to repeatedly execute a process of sending a first request packet to the communication device and receiving a first response packet from the communication device in response to the first request packet. The first device may be configured to newly send the first request packet when a predetermined time period from receiving the first response packet has elapsed. The second device may be configured to repeatedly execute a process of sending a second request packet to the communication device and receiving a second response packet from the communication device in response to the second request packet. The second device may be configured to newly send the second request packet when the predetermined time period from receiving the second response packet has elapsed. The communication device may comprise one or more processors and a memory that stores a computer program including instructions to be executed by the one or more processors. The instructions may cause the one or more processors, when executed by the one or more processors, to function as a receiving control unit, a sending control unit and a deciding unit. The receiving control unit may be configured to receive the first request packet from the first device and receive the second request packet from the second device. The sending control unit may be configured to send the first response packet to the first device in response to the first request packet and send the second response packet to the second device in response to the second request packet. The deciding unit may be configured to decide a sending timing for sending the second response packet to the second device. The sending timing may be decided such that a time period from receiving the second request packet to sending the second response packet in response to the second request packet is longer than a time period from receiving the first request packet to sending the first response packet in response to the first request packet. The sending control unit may be configured to send the second response packet to the second device at the decided sending timing.

Moreover, a control method and a computer program for realizing the communication device described above, and a computer readable recoading device in which the computer program is stored, are also novel and useful. Further, a system that includes the communication device and the first and second device described above is also novel and useful.

EMBODIMENT

Figure 1:
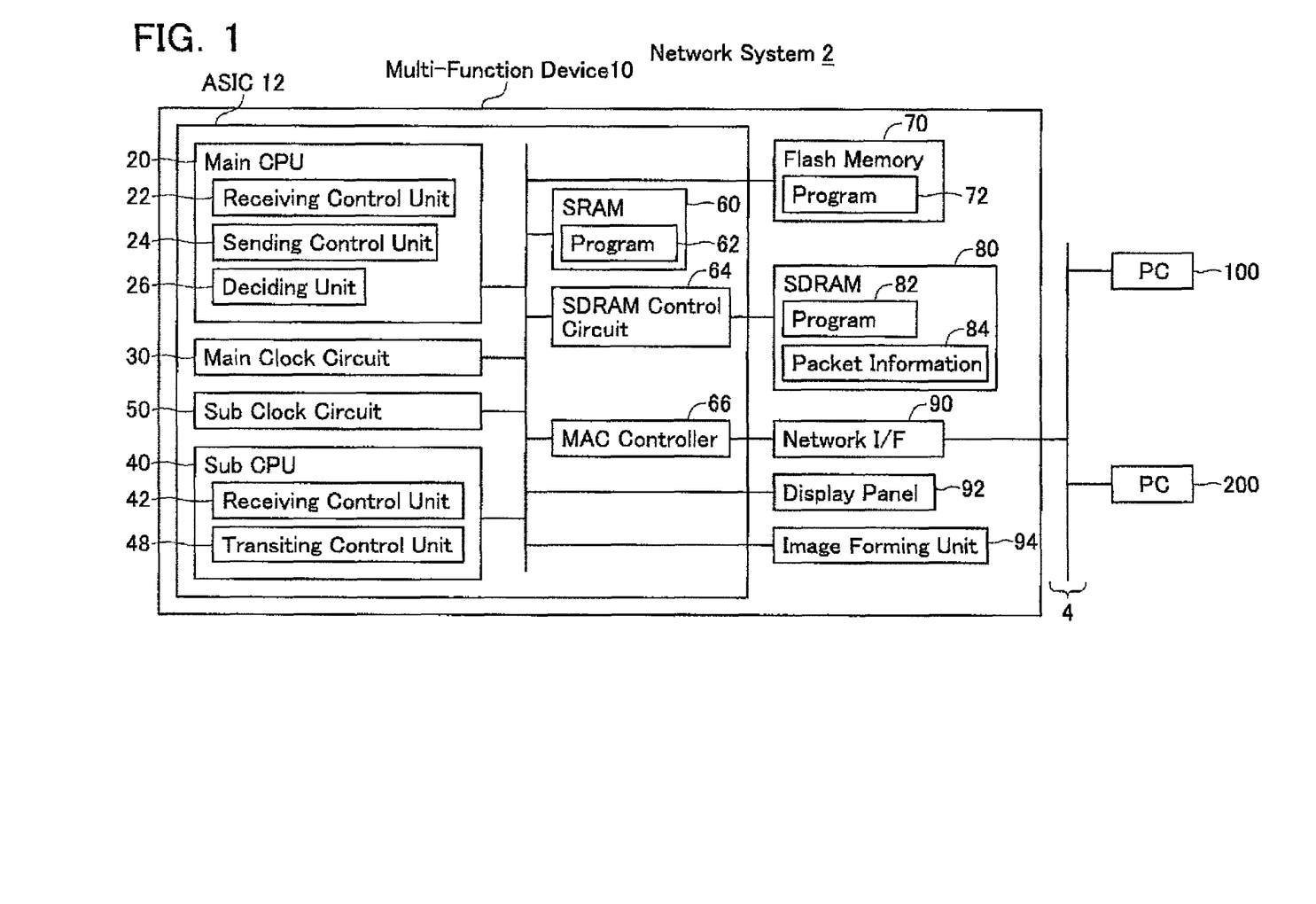
FIG. 1 shows the configuration of a network system.

As shown in FIG. 1, a network system 2 comprises PCs 100, 200, and a multi-function device 10 (i.e., a peripheral of the PCs 100, 200). The devices 10, 100, 200 can communicate with one another via a LAN 4.

(Configuration of Multi-Function Device 10)

As shown in FIG. 1, the multi-function device 10 comprises an ASIC (Application Specific Integrated Circuit) 12, a flash memory 70, an SDRAM 80, a network interface 90, a display panel 92, and an image forming unit 94.

The ASIC 12 comprises a main CPU 20, a main clock circuit 30, a sub CPU 40, a sub clock circuit 50, an SRAM 60, an SDRAM control circuit 64 and a MAC controller 66.

The main CPU 20 executes various processes in accordance with a program 82 that is being stored in the SDRAM 80. Thereby, the functions of a receiving control unit 22, a sending control unit 24, and a deciding unit 26 are realized. The main clock circuit 30 supplies a clock signal to the main CPU 20. While the clock signal is being supplied from the main clock circuit 30 to the main CPU 20, the main CPU 20 is in a non-sleeping state. While the clock signal is not being supplied to the main CPU 20, the main CPU 20 is in a sleeping state. The sleeping state of the main CPU 20 is a state in which power consumption is lower than in the non-sleeping state of the main CPU 20. The main clock circuit 30 is controlled by the sub CPU 40. That is, the supply and halting of the clock signal to the main CPU 20 is controlled by the sub CPU 40.

The sub CPU 40 executes various processes in accordance with a program 62 that is stored in the SRAM 60. Thereby, the functions of a receiving control unit 42 and a transiting control unit 48 are realized. The sub clock circuit 50 supplies a clock signal to the sub CPU 40. The frequency of the clock signal of the sub clock circuit 50 is lower than the frequency of the clock signal of the main clock circuit 30. Consequently, the power consumption for driving the sub CPU 40 is lower than the power consumption for driving the main CPU 20. Further, the processing speed of the main CPU 20 is faster than the processing speed of the sub CPU 40. The sub clock circuit 50 supplies the clock signal to the sub CPU 40 when a power supply of the multi-function device 10 is turned ON, and halts the clock signal when the power supply of the multi-function device 10 is turned OFF. That is, while the power supply of the multi-function device 10 is ON, the sub CPU 40 is maintained in the state where the clock signal is being supplied (the non-sleeping state). In a variant, the sub CPU 40 may be in the sleeping state while the main CPU 20 is in the non-sleeping state. That is, the sub clock circuit 50 may halt the clock signal to the sub CPU 40 while the main CPU 20 is in the non-sleeping state.

The SRAM 60 can be accessed from the CPUs 20, 40. When the power supply of the multi-function device 10 is turned ON, the main CPU 20 expands a compressed program 72 in the flash memory 70, and stores the expanded program 62 in the SRAM 60.

The SDRAM control circuit 64 starts or halts the supply of the clock signal to the SDRAM 80 in accordance with an instruction from the sub CPU 40, so as to cause the state of the SDRAM 80 to transit between a normal behavior mode, in which power consumption is relatively high, and a self refresh mode, in which the power consumption is relatively low.

The MAC controller 66 is connected with the network interface 90. Upon a packet being received by the network interface 90 via the LAN 4, etc., the MAC controller 66 supplies a packet interruption request signal to an interrupt controller (not shown) of the main CPU 20 or the sub CPU 40.

The flash memory 70 is provided at the exterior of the ASIC 12. The flash memory 70 can be accessed from the CPUs 20, 40. The flash memory 70 stores the program 72, which is the compressed state of the programs 62, 82 executed by the CPUs 20, 40.

The SDRAM 80 can be accessed from the main CPU 20. The SDRAM 80 has a total memory capacity greater than that of the SRAM 60, and can be accessed (read from, written into) faster by the CPUs 20, 40. Consequently, the power consumption of the SDRAM 80 is higher than the power consumption of the SRAM 60. The SDRAM 80 is controlled by the SDRAM control circuit 64, so as to transit in state between the normal behavior mode and the self refresh mode. Further, the SDRAM 80 can store packet information 84. The packet information 84 is information in which a receiving time of a status request packet and a MAC address of a sending source device (e.g., the PC 100) of the status request packet are associated (see FIG. 3).

The display panel 92 displays information in accordance with an instruction from the main CPU 20. A touch button for accepting an operation from a user is disposed in the display panel 92. The image forming unit 94 comprises an ink jet type or laser type image forming mechanism and, in accordance with an instruction from the main CPU 20, prints an image represented by print data received from an external device (e.g., the PCs 100, 200) onto a printing paper.

(State Transiting of Multi-Function Device 10)

The state of the multi-function device 10 transits between a ready state and the sleeping state. When the power supply of the multi-function device 10 is turned ON, the multi-function device 10 assumes the ready state.

(Ready State)

In a case where the multi-function device 10 is in the ready state, the two CPUs 20, 40 are in the non-sleeping state (the state of being supplied with the clock signals from the two clock circuits 30, 50 respectively), and the two RAMs 60, 80 are in the normal behavior mode. In this state, the main CPU 20 can execute a normal process. The normal process includes a printing process in accordance with a printing instruction packet, a displaying process in accordance with an operation the user has performed on the display panel 92, etc. Moreover, in a case where the multi-function device 10 is in the ready state, the main CPU 20 stores a state variable indicating the ready state in the SDRAM 80.

(Sleeping State)

Figure 2:
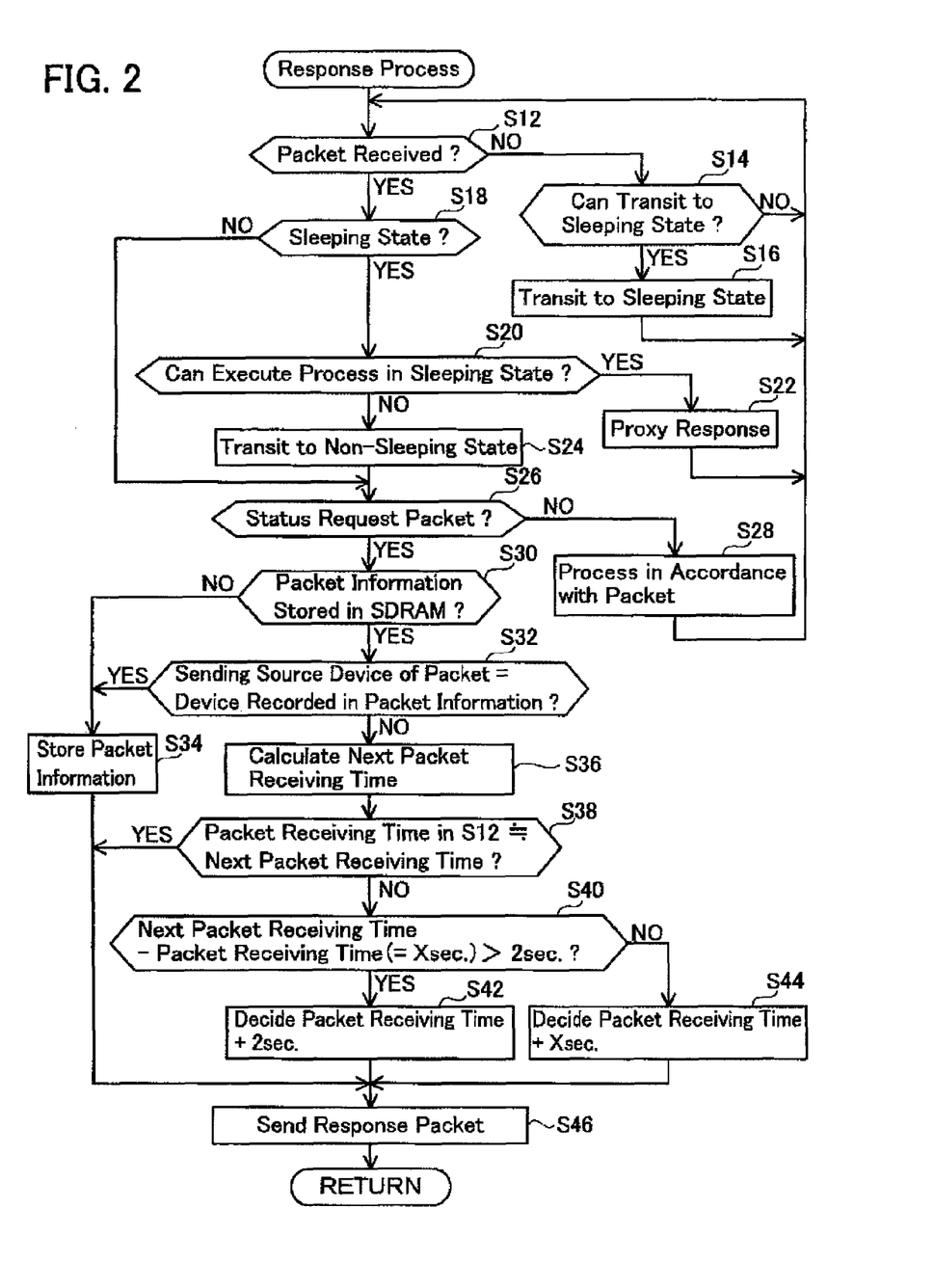
FIG. 2 shows a flowchart of a response process.

The multi-function device 10 transits from the ready state to the sleeping state by means of the sub CPU 40 executing a process S16, etc. of FIG. 2 (to be described). In a case where the multi-function device 10 is in the sleeping state, the main CPU 20 is in the sleeping state (the state in which the clock signal from the main clock circuit 30 has been halted), the sub CPU 40 is in the non-sleeping state (the state in which the clock signal from the sub clock circuit 50 is being supplied), the SRAM 60 is in the normal behavior mode, and the SDRAM 80 is in the self refresh mode. In a case where the main CPU 20 should execute the normal process (the printing process, displaying process, etc.) while the multi-function device 10 is in the sleeping state, the multi-function device 10 transits to the ready state.

Moreover, when the multi-function device 10 is transited from the ready state to the sleeping state, the main CPU 20 moves the state variable in the SDRAM 80 to the SRAM 60. When the multi-function device 10 has been transited to the sleeping state, the sub CPU 40 changes the state variable in the SRAM 60 to a state variable indicating the sleeping state. Further, when the multi-function device 10 is transited from the sleeping state to the ready state, the sub CPU 40 moves the state variable in the SRAM 60 to the SDRAM 80. When the multi-function device 10 has been transited to the ready state, the main CPU 20 changes the state variable in the SDRAM 80 to a state variable indicating the ready state.

(Configuration of PC 100)

A status monitoring program (e.g., a status monitor) for monitoring the status of the multi-function device 10 is installed in the PC 100. The user can activate the status monitoring program by operating the PC 100. When the status monitoring program has been activated, the PC 100 acquires status information of the multi-function device 10 from the multi-function device 10.

Specifically, when the status monitoring program has been activated, the PC 100 sends a status request packet to the multi-function device 10. Moreover, the status request packet includes the MAC address of the PC 100. In response to the status request packet, the PC 100 receives a response packet that includes status information from the multi-function device 10. The PC 100 displays the status information on a display unit of the PC 100 in accordance with the received response packet. When a predetermined waiting period (30 seconds in the present embodiment) from receiving the response packet has elapsed, the PC 100 newly sends the status request packet to the multi-function device 10. That is, while the status monitoring program is activated, the PC 100 repeatedly executes a sending process for sending the status request packet and a receiving process for receiving the response packet.

Moreover, the status information includes information indicating the state of the multi-function device 10 (the sleeping state or the ready state), availability of printing paper, availability of toner, and error information during printing (e.g., paper out, malfunction of image forming unit, etc.).

The PC 100 repeatedly acquires the status information from the multi-function device 10 at approximately 30 seconds intervals (the aforementioned waiting period). Thereby, the user of the PC 100 can confirm the latest status of the multi-function device 10. According to this configuration, in a case where, for example, the printing process is being executed in the image forming unit 94 of the multi-function device 10, the user of the PC 100 can learn as soon as possible that the printing paper has run out. Further, since the PC 100 regularly acquires the status information from the multi-function device 10, the user of the PC 100 need not execute an operation on the PC 100 to acquire the status information of the multi-function device 10.

In a case where the response packet is not received from the multi-function device 10 even though 2 seconds (called "time-out period" below) have elapsed from sending the status request packet to the multi-function device 10, the PC 100 determines that the response packet cannot be received. In this case, the PC 100 again sends the status request packet to the multi-function device 10. In a case where the response packet is not received within the time-out period despite a predetermined number of status request packets having been sent, the PC 100 displays information indicating communication error on the display unit of the PC 100. Thereby, the user of the PC 100 can learn that the multi-function device 10 and the PC 100 cannot communicate.

Moreover, after the time-out period has elapsed from sending the status request packet to the multi-function device 10, even if the response packet has been received from the multi-function device 10, the PC 100 does not display the status information in accordance with that response packet in the display unit of the PC 100.

The PC 200 has the same configuration as the PC 100. That is, when the status monitoring program has been activated, the PC 200 repeatedly executes a sending process to send a status request packet to the multi-function device 10 and a receiving process to receive a response packet from the multi-function device 10.

(Processes Executed by Main CPU 20 and Sub CPU 40)

Next, the contents of processes executed by the main CPU 20 and the sub CPU 40 will be described with reference to FIG. 2. The present processes are executed repeatedly while the power supply of the multi-function device 10 is ON. At a timing when the power supply of the multi-function device 10 has been turned ON, the multi-function device 10 is in the ready state. That is, the main CPU 20 executes the present processes at the timing when the power supply of the multi-function device 10 has been turned ON.

In S12, the receiving control unit 22 determines whether a packet has been received via the LAN 4. In a case where the packet has been received by the network interface 90, the MAC controller 66 supplies the packet interruption request signal to the main CPU 20. Upon acquiring the packet interruption request signal, the receiving control unit 22 moves the received packet from the network interface 90 to the SDRAM 80. In S12, the receiving control unit 22 determines whether the received packet is present in the SDRAM 80.

In a case where the packet is not being received (NO in S12), in S14 the main CPU 20 determines whether the main CPU 20 can be transited to the sleeping state (i.e., whether the multi-function device 10 can be transited to the sleeping state). For example, in a case where the main CPU 20 determines NO in all of a plurality of conditions that includes the conditions (1) to (5) below, it is determined that a transition to the sleeping state is possible (YES in S14). In a case where YES is determined for at least one of the conditions from among the plurality of conditions, it is determined that the transition to the sleeping is not possible (NO in S14).

The plurality of conditions includes: (1) whether the multi-function device 10 is in the process of sending a packet to the exterior, (2) whether an unprocessed packet is being stored in the SDRAM 80, (3) whether there is a device (e.g. the PC 100) that connects a TCP connection to the multi-function device 10, (4) whether a process to activate or shut down the multi-function device 10 is being executed, (5) whether a load on the network is high.

For example, in a case where the main CPU 20 is sending a response to a packet from the PC 100, etc., YES is determined in (1). For example, in a case where the multi-function device 10 has a Web server function, and the PC 100 currently connects by the TCP connection with the Web server of the multi-function device 10, YES is determined in (3). For example, in a case where a number of packets received in a predetermined time period immediately prior to executing the process S14 exceeds a predetermined number, the probability of the multi-function device 10 receiving a packet to be processed is high, and consequently YES is determined in (5). Consequently, as shown here, in a case where YES is determined for at least one of the conditions from among the conditions (1) to (5), it is determined that the sleeping state cannot be transited to (NO in S14).

On the other hand, in a case where NO is determined for all the conditions (1) to (5), the main CPU 20 determines that it can be transited to the sleeping state (YES in S14). In the case of YES in S14, in S16 the transiting control unit 48 causes the main CPU 20 to transit from the non-sleeping state to the sleeping state. Specifically, the transiting control unit 48 instructs the main clock circuit 30 to halt the clock supply. Consequently, the main CPU 20 transits from the non-sleeping state to the sleeping state. Moreover, in S16, further, the transiting control unit 48 causes the SDRAM 80 to transit from the normal behavior mode to the self refresh mode. Thereby, the multi-function device 10 assumes the sleeping state. Moreover, while the SDRAM 80 is in the self refresh mode, information cannot be written into the SDRAM 80 and information cannot be read out from the SDRAM 80. For example, a packet received by the network interface 90 cannot be stored in the SDRAM 80.

Moreover, prior to the transition to the sleeping state in S16, the main CPU 20 executes the process below in order to transit the multi-function device 10 from the ready state to the sleeping state. That is, the main CPU 20 moves proxy response information from the SDRAM 80 to the SRAM 60. The proxy response information includes information for the sub CPU 40 to execute a process in accordance with a packet received while the main CPU 20 is in the sleeping state (e.g., IP address, MAC address, node name of the multi-function device 10, etc.). Further, the main CPU 20 switches the RAM for storing the packet received via the LAN 4 from the SDRAM 80 to the SRAM 60. Next, the main CPU 20 masks (prohibits) interruption requests except from the sub CPU 40. Next, the main CPU 20 supplies a start signal to the sub CPU 40 for causing the sub CPU 40 to start processes. Upon acquiring the start signal, the sub CPU 40 executes the process of S16. Moreover, the main CPU 20 executes a WAIT command. When the WAIT command has been executed, the main CPU 20 assumes an execution halting state in which it remains on standby until an interruption request signal is supplied from the sub CPU 40.

When S16 ends, the process returns to S12. That is, S12 is executed while the main CPU 20 is in the sleeping state. In this case, the receiving control unit 42 of the sub CPU 40 executes S12. In a case where of NO in S12, NO is determined in S14 because the main CPU 20 is already in the sleeping state, and the process returns to S12.

In the process of S18 below, the case is described where the receiving control unit 42 of the sub CPU 40 determined in S12 that a packet has been received (the case where a packet is received while the main CPU 20 is in the sleeping state).

In S18, the sub CPU 40 determines whether the main CPU 20 is in the sleeping state. Specifically, the sub CPU 40 determines whether the main CPU 20 is in the sleeping state by checking the state variable in the SRAM 60 to determine whether the multi-function device 10 is in the sleeping state. In this case, YES is determined in S18 and in S20 then the sub CPU 40 determines, by analyzing the packet received in S12, whether the sub CPU 40 can execute a process in accordance with the packet.

For example, the sub CPU 40 determines whether the sub CPU 40 can execute a response process in accordance with the packet received in S12 using the proxy response information in the SRAM 60. Response processes which the sub CPU 40 can execute as a proxy include, e.g., a response to PING, a response to an ARP (Address Resolution Protocol) packet, etc. Moreover, in a case where the packet received in S12 is a status request packet from the PCs 100, 200, the sub CPU 40 determines the sub CPU 40 cannot execute a process in accordance with the packet.

In a case where of YES in S20, in S22 the sub CPU 40 executes the process in accordance with the packet received in S12, and returns to S12. In a case where of NO in S20, in S24 the transiting control unit 48 transits the main CPU 20 from the sleeping state to the non-sleeping state. Specifically, the transiting control unit 48 instructs the main clock circuit 30 to start the clock supply to the main CPU 20. Consequently, the clock is supplied to the main CPU 20, and the main CPU 20 transits from the sleeping state to the non-sleeping state. The transiting control unit 48 supplies an interruption request signal to the main CPU 20.

The sub CPU 40 further executes a process for causing the SDRAM 80 to transit from the self refresh mode to the normal behavior mode, a process for switching a storage destination of the packet received from the external device from the SRAM 60 to the SDRAM 80, a process for moving the information in the SRAM 60 to the SDRAM 80, etc.

Upon being supplied with the interruption request signal from the sub CPU 40, the main CPU 20 releases the WAIT command. The main CPU 20 moves unprocessed packets that are being stored in the SRAM 60 into the SDRAM 80.

In S26, the main CPU 20 determines whether the packet received in S12 is a status request packet. Specifically, the main CPU 20 determines whether the packet received in S12 is a packet requesting SNMP (Simple Network Management Protocol) object data. For example, in a case where a destination port number of the packet is a port number indicating SNMP (i.e., "161") and a PDU (Protocol Data Unit) type included in a SNMP message of the packet indicates GetRequest or GetNextRequest, the main CPU 20 determines that the packet is a status request packet.

In a case where it is determined that the packet is not a status request packet (NO in S26), in S28 the main CPU 20 executes a process in accordance with the packet received in S12 (e.g., the normal process (a printing process in accordance with a print instruction packet, etc.)), and returns to S12.

On the other hand, in a case where it is determined that the packet is a status request packet (YES in S26), in S30 the main CPU 20 determines whether the packet information 84 is being stored in the SDRAM 80. In a case where the packet information 84 is not being stored in the SDRAM 80 (NO in S30), the main CPU 20 proceeds to S34, and in a case where the packet information 84 is being stored in the SDRAM 80 (YES in S30), the main CPU 20 proceeds to S32.

In S32, the main CPU 20 determines whether the sending source device of the status request packet received in S12 is identical with the device stored as the packet information 84. Specifically, the main CPU 20 determines whether the MAC address of the sending source device included in the status request packet is identical with the MAC address included in the packet information 84. Here, YES is determined in S32 in a case where the two MAC addresses are identical, and the main CPU 20 proceeds to S34. On the other hand, NO is determined in S32 in a case where the two MAC addresses are different, and the main CPU 20 proceeds to S36.

In S34, the main CPU 20 stores the packet information 84 in the SDRAM 80. When NO was determined in S30 (i.e., in a case where the packet information 84 is not being stored), in S34 the main CPU 20 stores an association of the MAC address of the sending source device of the status request packet and the receiving time of the status request packet in the SDRAM 80. On the other hand, when YES was determined in S32 (i.e., in a case where the packet information 84 is already being stored in the SDRAM 80), in S34, the main CPU 20 updates the receiving time of the previous status request packet included in the packet information 84 to the receiving time of the present status request packet. When S34 ends, the process proceeds to S46. Moreover, if a next status request is not received from a device (e.g., the PC 100) corresponding to the MAC address included in the packet information 84 stored in the SDRAM 80 even if a predetermined time period (e.g., 1 minute) has elapsed, the main CPU 20 deletes the packet information 84 that is being stored in the SDRAM 80.

On the other hand, as described above, in a case where the sending source device (described below using "the PC 200" as an example) of the status request packet received in the present S12 is different from the device (described below using "the PC 100" as an example) recorded in the packet information 84 (the case of NO in S32), the process of S36 is executed. In S36, using the packet information 84 that is being stored in the SDRAM 80, the deciding unit 26 calculates the next packet receiving time, which is the time that the next status request packet is received from the PC 100. Specifically, the deciding unit 26 calculates the next packet receiving time by adding a waiting period (i.e., 30 seconds), which has been stored in advance in the SDRAM 80, to the receiving time included in the packet information 84. Moreover, a manufacturer of the multi-function device 10 stores the waiting period (i.e., 30 seconds) in advance in the SDRAM 80. In a variant, the main CPU 20 may specify the waiting period using an interval at which the status request packets are received from the PC 100, and may store the specified waiting period in the SDRAM 80.

Next, in S38, it is determined whether the receiving time of the status request packet received from the PC 200 in S12 is substantially equal to the next packet receiving time of the PC 100 calculated in S36. Here, "the receiving time is substantially equal" means a state in which, e.g. the difference between the receiving time of the status request packet and the next packet receiving time is shorter than the time-out period (e.g., one tenth of the time-out period (i.e., 0.2 seconds)).

Moreover, the PC 100 sends the next status request packet when the waiting period from receiving the response packet in response to the previous status request packet has elapsed. Thus, strictly speaking, the deciding unit 26 must calculate the next packet receiving time by adding the waiting period to the time when the PC 100 received the response packet in response to the previous status request packet. However, the time period from the multi-function device 10 receiving the status request packet from the PC 100 to the PC 100 receiving a response packet from the multi-function device 10 in response to the status request packet is extremely short. Consequently, in effect, the time of the multi-function device 10 receiving the status request packet and the time of the PC 100 receiving the response packet in response to the status request packet is substantially equal.

Here, in a case where the two packet receiving times are substantially equal, YES is determined in S38, and the process proceeds to S46. In a case where the two packet receiving times are not substantially equal, NO is determined in S38, and the process proceeds to S40. In S40, the deciding unit 26 determines whether a difference (i.e., X seconds) between the next packet receiving time calculated in S36 and the receiving time of the status request packet in S12 is greater than the time-out period (i.e., 2 seconds). In a case where the difference (i.e., X seconds) is greater than the time-out period (YES in S40), in S42 the deciding unit 26 decides the sending timing, for sending the response packet in response to the status request packet received in S12, at a time such that the time-out period (i.e., 2 seconds) is added to the receiving time of the status request packet of the PC 200, which was received in S12. When S42 ends, the process proceeds to S46. According to this configuration, the sending source device (i.e., the PC 200) of the status request packet can avoid determining that a response to the status request packet cannot be received.

Moreover, in a case where the response packet cannot be received from the multi-function device 10 even though the time-out period from sending the status request packet has elapsed, the PC 200 determines that the response cannot be received. Thus, strictly speaking, the deciding unit 26 should execute the following process in S40 and S42. That is, in the process of S40, the deciding unit 26 should determine whether the difference (i.e., X seconds) is greater than a specific period in which a round-trip communication time between the multi-function device 10 and the PC 200 has been subtracted from the time-out period. In the process S42, the deciding unit 26 should decide the sending timing for sending the response packet in response to the status request packet of the PC 200 received in S12 at a time such that the aforementioned specific period has been added to the receiving time of the status request packet. However, the round-trip communication time between the multi-function device 10 and the PC 200 is negligibly shorter than the time-out period. Consequently, even if, as in the processes of S40 and S42, the response packet is sent at the sending timing decided using the time-out period, the situation does not occur whereby the PC 200 determines that a response to the status request packet cannot be received.

In a case where of NO in S40, i.e., X seconds are smaller than the time-out period, in S44 the deciding unit 26 decides the sending timing for sending the response packet at a time such that X seconds have been added to the receiving time of the status request packet of the PC 200 received in S12. When S44 ends, the process proceeds to S46. After the processes S34, S42 or S44 have ended, or after YES was determined in S38, in S46, the sending control unit 24 sends a response packet to the sending source device of the status request packet of S12 as the response to the status request packet of S12. The response packet includes the current status information of the multi-function device 10. Then the process returns to S12. In S46, which is executed when the process S34 is executed, or after YES was determined in S38, the sending control unit 24 sends the response packet in response to the status request packet immediately upon generating the response packet (without waiting). In this case, the time period from receiving the status request packet until sending the response packet is extremely short. On the other hand, in S46, which is executed after the processes S42 or S44 have been executed, after the sending control unit 24 has generated the response packet in response to the status request packet, the sending control unit 24 waits until the timing decided in S42 or S44, and sends the response packet when the decided timing is reached.

Moreover, in a case where the receiving control unit 22 of the main CPU 20 determines in S12 that a packet has been received (in a case where a packet has been received while the multi-function device 10 is in the ready state), the main CPU 20 determines NO in S18, and executes the process from S26 onward. The process from S26 onward is the same as above.

(Effects of Present Embodiment)

Figure 3:
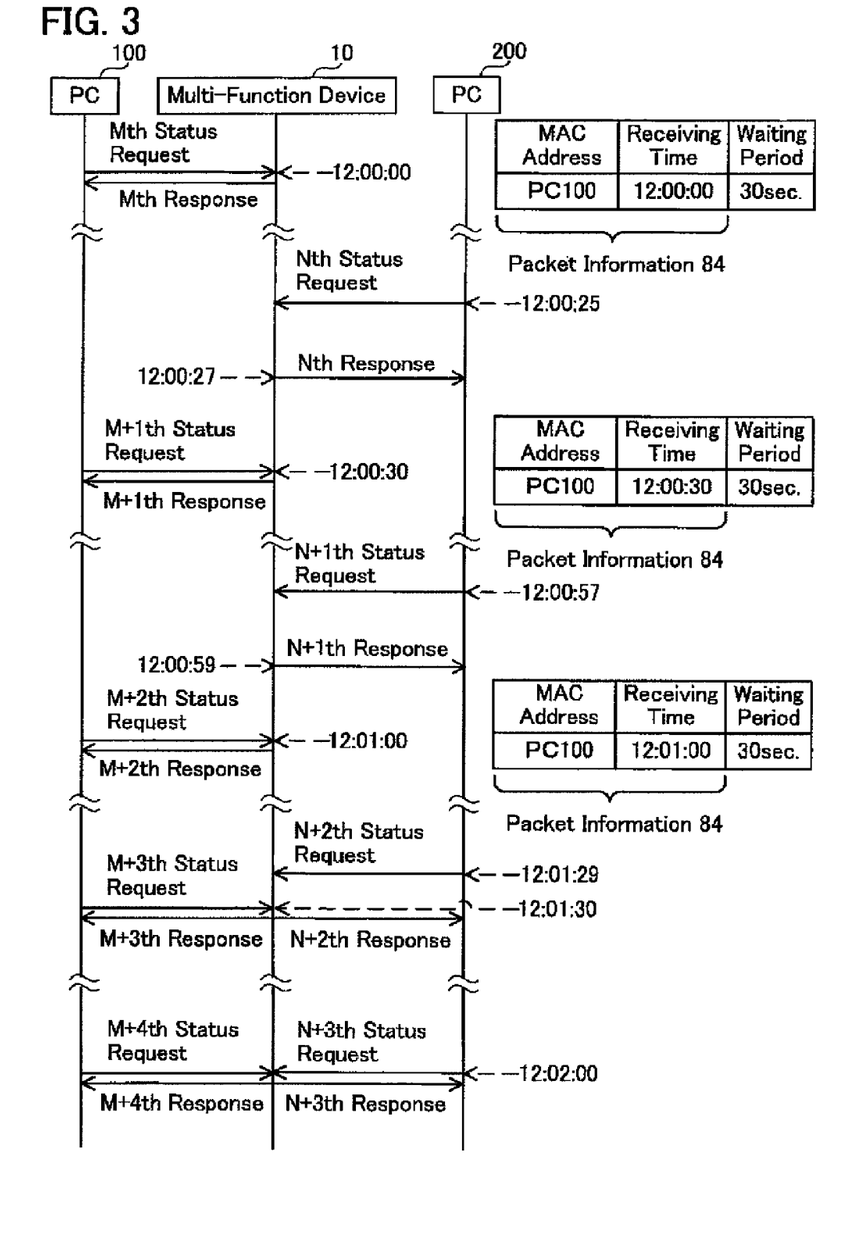
FIG. 3 shows a sequence diagram representing operations of devices.

The operations of the devices 10, 100, 200 and the effects of the present embodiment will be described with reference to FIG. 3. Moreover, in FIG. 3, the main CPU 20 is started in a situation of being in the sleeping state.

At 12:00:00, the PC 100 sends an Mth (M being equal to or more than 1) status request packet to the multi-function device 10. Upon receiving the Mth status request packet, the transiting control unit 48 causes the main CPU 20 to transit to the non-sleeping state (S24 of FIG. 2). The main CPU 20 stores a receiving time (i.e., "12:00:00") in association with the MAC address of the PC 100 (i.e., "the PC 100") (i.e., this is the packet information 84) (S34 of FIG. 2). The sending control unit 24 generates an Mth response packet in response to the Mth status request packet. The sending control unit 24 sends the Mth response packet to the PC 100 immediately after it has been generated (S46 of FIG. 2).

When the Mth response packet has been sent, the transiting control unit 48 causes the main CPU 20 to transit from the non-sleeping state to the sleeping state (S16 of FIG. 2).

Next, at 12:00:25, the PC 200 sends an Nth (N being equal to or more than 1) status request packet to the multi-function device 10. Upon receiving the Nth status request packet, the transiting control unit 48 causes the main CPU 20 to transit to the non-sleeping state (S24 of FIG. 2).

The deciding unit 26 calculates the next packet receiving time (a receiving time of an M+1th status request packet from the PC 100) (i.e., "12:00:30") by adding the waiting period (i.e., 30 seconds) to the receiving time "12:00:00" of the packet information 84 (S36 of FIG. 2). The difference (i.e., 5 seconds) between the calculated next packet receiving time and the receiving time of the Nth status request packet (i.e., "12:00:25") is longer than the time-out period (i.e., 2 seconds) (YES in S40 of FIG. 2). Consequently, the deciding unit 26 decides a sending timing for sending an Nth response packet in response to the Nth status request packet at "12:00: 27", in which the time-out period has been added to the receiving time "12:00:25" of the Nth status request packet (S42 of FIG. 2). The sending control unit 24 sends the Nth response packet at 12:00:27 (S46 of FIG. 2). According to the above configuration, the multi-function device 10 can bring the sending timing of the Nth response packet closer to the sending timing of an M+1th response packet in response to the M+1th status request packet. Consequently, the receiving timing of an N+1th request packet can be brought closer to the receiving timing of an M+2th request packet.

When the Nth response packet has been sent, the transiting control unit 48 causes the main CPU 20 to transit from the non-sleeping state to the sleeping state (S16 of FIG. 2).

Next, at 12:00:30, the PC 100 sends the M+1th status request packet to the multi-function device 10. Moreover, strictly speaking, the PC 100 sends the M+1th status request packet 30 seconds after receiving the Mth response packet. However, since the time period from the PC 100 sending the Mth status request packet to receiving the Mth response packet is extremely short, substantially the time period from sending the Mth status request packet to receiving the M+1th status request packet can be said to be 30 seconds.

Upon receiving the M+1th status request packet, the transiting control unit 48 transits the main CPU 20 to the non-sleeping state (S24 of FIG. 2). The main CPU 20 stores the packet information 84 (S34 of FIG. 2). The sending control unit 24 generates an M+1th response packet in response to the M+1th status request packet, and immediately sends the generated M+1th response packet (S46 of FIG. 2). When the M+1th response packet has been sent, the transiting control unit 48 causes the main CPU 20 to transit from the non-sleeping state to the sleeping state (S16 of FIG. 2).

At 12:00:57, the PC 200 sends an N+1th status request packet to the multi-function device 10. Upon receiving the N+1th status request packet, the transiting control unit 48 transits the main CPU 20 to the non-sleeping state (S24 of FIG. 2).

The deciding unit 26 calculates the next packet receiving time (a receiving time of the M+1th status request packet from the PC 100) (i.e., "12:01:00") by adding the waiting period (30 seconds) to the receiving time "12:00:30" of the packet information 84 (S36 of FIG. 2). The difference (i.e., 3 seconds) between the calculated next packet receiving time and the receiving time of the N+1th status request packet (i.e., "12:00:57") is longer than the time-out period (i.e., 2 seconds) (YES in S40 of FIG. 2). Consequently, the deciding unit 26 decides a sending timing for sending an N+1th response packet in response to the N+1th status request packet at "12:00:59", in which the time-out period has been added to the receiving time "12:00:57" of the N+1th status request packet (S42 of FIG. 2). The sending control unit 24 sends the N+1th response packet at 12:00:59 (S46 of FIG. 2). In the above configuration, the multi-function device 10 can bring the sending timing of the N+1th response packet closer to the sending timing of an M+2th response packet in response to the M+2th request packet. Consequently, the receiving timing of an N+2th request packet can be brought closer to the receiving timing of an M+3th request packet.

When the N+1th response packet has been sent, the transiting control unit 48 causes the main CPU 20 to transit from the non-sleeping state to the sleeping state (S16 of FIG. 2).

At 12:01:00, the PC 100 sends the M+2th status request packet to the multi-function device 10. Upon receiving the M+2th status request packet, the transiting control unit 48 transits the main CPU 20 to the non-sleeping state (S24 of FIG. 2). The main CPU 20 stores the packet information 84 (S34 of FIG. 2). The sending control unit 24 generates the M+2th response packet in response to the M+2th status request packet, and immediately sends the generated M+2th response packet (S46 of FIG. 2). When the M+2th response packet has been sent, the transiting control unit 48 causes the main CPU 20 to transit from the non-sleeping state to the sleeping state (S16 of FIG. 2).

At 12:01:29, the PC 200 sends the N+2th status request packet to the multi-function device 10. Upon receiving the N+2th status request packet, the transiting control unit 48 transits the main CPU 20 to the non-sleeping state (S24 of FIG. 2).

The deciding unit 26 calculates the next packet receiving time (a receiving time of an M+3th status request packet from the PC 100) (i.e., "12:01:30") by adding the waiting period (30 seconds) to the receiving time "12:01:00" of the packet information 84 (S36 of FIG. 2). The difference between the calculated next packet receiving time and the receiving time of the N+2th status request packet (i.e., "12:01:29") is shorter than the time-out period (i.e., 2 seconds) (NO in S40 of FIG. 2). Consequently, the deciding unit 26 decides a sending timing, for sending an N+2th response packet in response to the N+2th status request packet, at "12:01:30", in which the difference of 1 second has been added to the receiving time "12:01:29" of the N+2th status request packet (S44 of FIG. 2). In this configuration, the sending timing of the response packet to the PC 200 is decided using the receiving timing of the status request packet from the PC 100. Consequently, the receiving timing of the status request packet from the PC 200 can adequately be brought closer to the receiving timing of the status request packet from the PC 100.

At 12:01:30, the PC 100 sends the M+3th status request packet to the multi-function device 10. Since this timing is identical to the sending timing for sending the N+2th response packet, the main CPU 20 is maintained in the non-sleeping state. The sending control unit 24 immediately sends a generated M+3th response packet to the PC 100 in response to the M+3th status request packet (S46 of FIG. 2). Further, since the sending timing "12:01:30" of the N+2th response packet has been reached, the sending control unit 24 sends the N+2th response packet to the PC 200 (S46 of FIG. 2). Consequently, the sending timing of the M+3th response packet and the sending timing of the N+2th response packet can be made substantially equal. Moreover, since the sending control unit 24 actually sends the response packets in turn, strictly speaking the sending timing is not identical.

When the M+2th response packet has been sent, the transiting control unit 48 causes the main CPU 20 to transit from the non-sleeping state to the sleeping state (S16 of FIG. 2).

When 12:02:00 is reached, the receiving control unit 42 receives an M+4th status request packet from the PC 100 and an N+3th status request packet from the PC 200 respectively. According to this configuration, the multi-function device 10 can receive the status request packet from the PC 100 and the status request packet from the PC 200 at substantially equal timing.

Moreover, "receive at substantially equal timing" means, for example, a state where the difference between the receiving time of the status request packet and the next packet receiving time calculated in S36 is shorter than the time-out period (e.g., is 1/10 the time-out period (i.e., 0.2 seconds)). Alternatively, "receive at substantially equal timing" means receive within a time period that is shorter than the time period between executing the process S46 of FIG. 2 for the status request packet received in S12 of FIG. 2 and then returning to S12 of FIG. 2.

Further, by bringing the receiving timing of the status request packet from the PC 200 closer to the receiving timing of the status request packet from the PC 100, the multi-function device 10 can reduce the frequency with which the main CPU 20 is transited from the sleeping state to the non-sleeping state. Consequently, the power consumption of the multi-function device 10 can be reduced. In particular, during the time period after the response packet has been sent in response to the status request packet received from the PC 100 in S12 of FIG. 2 (S46 of FIG. 2) and before S12 of FIG. 2 is returned to, in a case where a status request packet is received from the PC 200, YES is determined in S12, and the transit of the main CPU 20 to the sleeping state can be prevented.

In the present embodiment, the multi-function device 10 sends the response packet to the PC 200 at a timing such that the time period from receiving the status request packet from the PC 200 to sending the response packet thereto is longer than the time period from receiving the request packet from the PC 100 to sending the response packet thereto. According to this configuration, the sending timing of the response packet in response to the status request packet from the PC 200 can be made closer to the sending timing of the response packet in response to the status request packet from the PC 100, which is received next after the status request packet from the PC 200. Consequently, the receiving timing of the status request packet from the PC 200 is made closer to the receiving timing of the status request packet from the PC 100.

(Corresponding Relationships)

The multi-function device 10, the PC 100 and the PC 200 are respectively examples of the "communication device", the "first device" and the "second device". The status request packet sent from the PC 100 is an example of the "first request packet", and the status request packet sent from the PC 200 is an example of the "second request packet". The main CPU 20 and the sub CPU 40 are examples of the "processor". The state where the two CPUs 20, 40 are both in the non-sleeping state is an example of the "high consumption state", and the state where the main CPU 20 is in the sleeping state and the sub CPU 40 is in the non-sleeping state is an example of the "low consumption state".

(Variants)

(1) In the above embodiment, the multi-function device 10 comprises the two CPUs 20, 40. However, instead, the multi-function device 10 may comprise only the main CPU 20. In this case, the frequency of the clock signal supplied to the main CPU 20 may transit to a low state and a high state. In the state where the frequency of the clock signal is high, the power consumption of the main CPU 20 is relatively high, and in the state where the frequency of the clock signal is low, the power consumption of the main CPU 20 is relatively low. In this variant, the main CPU 20 is an example of the "processor", the state where the frequency of the clock signal supplied to the main CPU 20 is high is an example of the "high consumption state", and the state where the frequency of the clock signal supplied to the main CPU 20 is low is an example of the "low consumption state".

(2) In the above embodiment, the deciding unit 26 decides the sending timing of the response packet using the packet information 84 that is being stored in the SDRAM 80 (S36 to S44 of FIG. 2). However, until an interval between the receiving timing of the status request packet from the PC 100 and the receiving timing of the status request packet from the PC 200 becomes equal to or less than a predetermined interval (e.g., 1 second), the deciding unit 26 may decide the sending timing for sending the response packet in response to the status request packet from the PC 200 at a timing where a predetermined time period (e.g., 1 second) has been added to the receiving timing when the status request packet was received. The present variant also includes the configuration in which the "deciding unit is configured to decide a sending timing for sending the second response packet, wherein the sending timing is decided such that a time period from receiving the second request packet to sending the second response packet in response to the second request packet is longer than a time period from receiving the first request packet to sending the first response packet in response to the first request packet".

(3) In the above embodiment, the function of the deciding unit 26 is realized by the main CPU 20 executing a process in accordance with the program 82. However, the function of a deciding unit may be realized by the sub CPU 40 executing a process in accordance with the program 62. In this case, the processes S26, S30 to S44 of FIG. 2 may be executed by the sub CPU 40.

(4) In the above embodiment, the deciding unit 26 decides the sending timing both in the case of a status request packet being received while the main CPU 20 is in the non-sleeping state and in the case of a status request packet being received while the main CPU 20 is in the sleeping state (S42 and S44 of FIG. 2). However, in the case of a status request packet being received while the main CPU 20 is in the non-sleeping state, the deciding unit 26 may send a response packet immediately without deciding a sending timing. According to this configuration, in a case where a status request packet is received while the main CPU 20 is in the non-sleeping state, the process for deciding the sending timing of the response packet need not be executed.

(5) In the above embodiment, the deciding unit 26 does not decide the sending timing of a response packet to the device (e.g., the PC 100) that is being recorded in the packet information 84. However, the deciding unit 26 may decide the sending timing of a response packet to the device (e.g., the PC 100) that is being recorded in the packet information 84. That is, the deciding unit 26 may decide the sending timing of response packets to all the received status request packets.

(6) There is no restriction on the number of PCs connected with the multi-function device 10. The multi-function device 10 may decide the sending timing of response packets to a plurality of PCs such that the receiving timing of the status request packets from the plurality of PCs is closer to the receiving timing of the status request packet of the PC 100 that is being stored in the packet information 84. Further, in a case where the plurality of PCs are connected with the multi-function device 10, the multi-function device 10 may store the receiving time of the status request packet from one or more PCs in the packet information 84. The multi-function device 10 may decide the sending timing of the response packets such that each receiving timing of the status request packets from the multiple PCs other than the PC being recorded in the packet information 84 is closer to the receiving timing of the status request packets from any of the one or more PCs included in the packet information 84. For example, in a case where ten PCs are connected with the multi-function device 10, the multi-function device 10 may classify five PCs as a first group, and the other five PCs as a second group. The multi-function device 10 may designate one PC in the first group a standard PC, and may cause the receiving timing of the other four PCs in the first group to be close to the receiving timing of the one standard PC. Similarly, the multi-function device 10 may designate one PC in the second group a standard PC, and may cause the receiving timing of the other four PCs in the second group to be close to the receiving timing of the one standard PC in the second group. In this case, the receiving timing of the standard PC in the first group and the receiving timing of the standard PC in the second group need not be identical.

(7) In the above embodiment, the deciding unit 26 decides the sending timing of the response packet to the PC 200 using the receiving time of the status request packet from the PC 100 and the waiting period (S40 of FIG. 2). However, the deciding unit 26 may decide the sending timing of the response packet to the PC 200 using the sending timing when the multi-function device 10 sends the response packet in response to the status request packet from the PC 100, or using the receiving timing when the PC 100 receives the response packet in response to the status request packet. In the present variant, the sending timing when the multi-function device 10 sends the response packet in response to the status request packet from the PC 100, or the receiving timing when the PC 100 receives the response packet in response to the status request packet are examples of "timing related to receiving the first request packet".

(8) In the above embodiment, the units 22 to 26 are realized by the main CPU 20 executing processes in accordance with the program 82. However, at least one of the units 22 to 26 may be realized by hardware such as a logic circuit, etc. Further, the units 42, 48 are realized by the sub CPU 40 executing processes in accordance with the program 62. However, at least one of the units 42, 48 may be realized by hardware such as a logic circuit, etc.

(9) The "communication device" need not be the multi-function device, but may be a communication device such as a PC, printer, server, PDA, etc.

The invention claimed is:

1. A communication device to be respectively connected with a first device and a second device, wherein the first device is configured to repeatedly execute a process of sending a first request packet to the communication device and receiving a first response packet from the communication device in response to the first request packet, and configured to newly send the first request packet when a predetermined time period from receiving the first response packet has elapsed, and the second device is configured to repeatedly execute a process of sending a second request packet to the communication device and receiving a second response packet from the communication device in response to the second request packet, and configured to newly send the second request packet when the predetermined time period from receiving the second response packet has elapsed, and the communication device comprises:
one or more processors; and
a memory that stores a computer program including instructions to be executed by the one or more processors, wherein the instructions cause the one or more processors, when executed by the one or more processors, to function as:

a receiving control unit configured to receive the first request packet from the first device and receive the second request packet from the second device;

a sending control unit configured to send the first response packet to the first device in response to the first request packet and send the second response packet to the second device in response to the second request packet; and a deciding unit configured to decide a sending timing for sending the second response packet to the second device, wherein the sending timing is decided such that a time period from receiving the second request packet to sending the second response packet in response to the second request packet is longer than a time period from receiving the first request packet to sending the first response packet in response to the first request packet, wherein the sending control unit is configured to send the second response packet to the second device at the decided sending timing, the deciding unit is configured to decide the sending timing of the second request packet each time the second request packet is received, until a timing when the first request packet received is substantially equal to a timing when the second request packet is received, and each time the second request packet is received, the sending control unit is configured to send the second response packet in response to the second request packet at the sending timing decided for the second request packet.

2. The communication device as in claim 1, wherein
the receiving control unit is configured to receive an Mth (the M being equal to or more than 1) first request packet from the first device and receive an Nth (the N being equal to or more than 1) second request packet from the second device after the Mth first request packet has been received from the first device and before an M+1 th first request packet is received from the first device, the sending control unit is configured to send an Mth first response packet to the first device in response to the Mth first request packet and send an Nth second response packet to the second device in response to the Nth second request packet, the deciding unit is configured to decide a sending timing of the Nth second response packet such that a time period from receiving the Nth second request packet to sending the Nth second response packet is longer than a time period from receiving the Mth first request packet to sending the Mth first response packet, and the sending control unit is configured to send the Nth second response packet to the second device at the decided sending timing.

3. The communication device as in claim 1, wherein
the deciding unit is configured to decide the sending timing of the second response packet using a timing related to receiving the first request packet.

4. The communication device as in claim 1, wherein
the second device is configured:

to execute a process in accordance with the second response packet in a case where the second response packet in response to the second request packet is received before a specific time period from sending the second request packet to the communication device has elapsed; and not to execute the process in accordance with the second response packet in a case where the second response packet in response to the second request packet is received after the specific time period from sending the second request packet to the communication device has elapsed, and the deciding unit is configured to decide the sending timing such that the time period from receiving the second request packet to sending the second response packet in response to the second request packet is equal to or shorter than the specific time period.

5. The communication device as in claim 4, wherein
the receiving control unit is configured to receive an Mth (the M being equal to or more than 1) first request packet from the first device and receive an Nth (the N being equal to or more than 1) second request packet from the second device after the Mth first request packet has been received from the first device and before the M+1th first request packet is received from the first device, the sending control unit is configured to send an Mth first response packet to the first device in response to the Mth first request packet and send an Nth second response packet to the second device in response to the Nth second request packet, and the deciding unit is configured:

to decide a sending timing of the Nth second response packet such that a time period from receiving the Nth second request packet to sending the Nth second response packet is identical to the specific time period in a case where a specific difference between a receiving timing of the M+1th first request packet and a receiving timing of the Nth second request packet is longer than the specific time period; and to decide the sending timing of the Nth second response packet such that the time period from receiving the Nth second request packet to sending the Nth second response packet is identical with the specific difference in a case where the specific difference is shorter than the specific time period.

6. The communication device as in claim 1, wherein
the one or more processors are capable of transiting between a high consumption state in which a power consumption is relatively high and a low consumption state in which the power consumption is relatively low,
the instructions cause the one or more processors, when executed by the one or more processors, to further function as:
a transiting control unit configured to cause the one or more processors to transit between the high consumption state and the low consumption state,
in a case where the first request packet is received while the one or more processors are in the low consumption state,
the transiting control unit is configured to cause the one or more processors to transit from the low consumption state to the high consumption state, and
the sending control unit is configured to send the first response packet in response to the first request packet while the one or more processors are in the high consumption state, and
in a case where the second request packet is received while the one or more processors are in the low consumption state,
the transiting control unit is configured to cause the one or more processors to transit from the low consumption state to the high consumption state, and
the sending control unit is configured to send the second response packet in response to the second request packet while the one or more processors are in the high consumption state.

7. A non-transitory computer readable tangible medium storing computer readable instructions for a communication device comprising one or more processors to be respectively connected with a first device and a second device, wherein
the first device is configured to repeatedly execute a process of sending a first request packet to the communication device and receiving a first response packet from the communication device in response to the first request packet and configured to newly send the first request packet when a predetermined time period from receiving the first response packet has elapsed, and
the second device is configured to repeatedly execute a process of sending a second request packet to the communication device and receiving a second response packet from the communication device in response to the second request packet, and configured to newly send the second request packet when the predetermined time period from receiving the second response packet has elapsed, and
the computer readable instructions, when executed by the one or more processors, instruct the communication device to execute processes comprising:
receiving the first request packet from the first device;
receiving the second request packet from the second device;
sending the first response packet to the first device in response to the first request packet;
sending the second response packet to the second device in response to the second request packet; and
deciding a sending timing for sending the second response packet to the second device, wherein the sending timing is decided such that a time period from receiving the second request packet to sending the second response packet in response to the second request packet is longer than a time period from receiving the first request packet to sending the first response packet in response to the first request packet, wherein
the second response packet is sent to the second device at the decided sending timing,
the sending timing of the second request packet is decided each time the second request packet is received, until a timing when the first request packet is received is substantially equal to a timing when the second request packet is received, and
each time the second request packet is received, the second response packet is sent in response to the second request packet at the sending timing decided for the second request packet.

* * * * *